United States Patent [19]
Holmes

[11] Patent Number: 5,425,960
[45] Date of Patent: Jun. 20, 1995

[54] LEGUME REHYDRATION CONTROL APPARATUS AND METHOD USING BUOYANCY RESTRAINT AND DETECTION

[76] Inventor: Grover C. Holmes, 1540 Robin Hood, Lafayette, Colo. 80026

[21] Appl. No.: 161,892

[22] Filed: Dec. 2, 1993

Related U.S. Application Data

[63] Continuation-in-part of Ser. No. 982,503, Nov. 27, 1992, abandoned.

[51] Int. Cl.$^6$ .......................... A23L 1/00; B23Q 15/00
[52] U.S. Cl. ...................................... 426/231; 99/493; 99/536; 426/507
[58] Field of Search ................... 426/231, 507, 634; 99/493, 516, 536

[56] References Cited

U.S. PATENT DOCUMENTS

| | | | |
|---|---|---|---|
| 2,584,150 | 2/1952 | Morris | 99/98 |
| 3,719,502 | 3/1973 | Keely | 99/98 |
| 3,867,553 | 2/1975 | Hitze et al. | 426/44 |
| 3,876,807 | 4/1975 | Wagner et al. | 426/46 |
| 4,088,790 | 5/1978 | Bevan et al. | 426/96 |
| 4,113,889 | 12/1978 | Baxley | 426/509 |
| 4,233,322 | 4/1980 | Fritze | 426/46 |
| 4,348,421 | 9/1982 | Sakakibara et al. | 426/394 |
| 4,543,878 | 10/1985 | Luchetti | 99/330 |
| 4,816,270 | 3/1989 | Turner | 426/243 |
| 4,900,578 | 2/1990 | Bakker et al. | 426/634 |
| 4,940,598 | 7/1990 | Zanichelli | 426/507 |

*Primary Examiner*—George Yeung
*Attorney, Agent, or Firm*—John R. Flanagan

[57] ABSTRACT

A legume rehydration control apparatus and method employ a buoyancy restraint device, a buoyancy detection device, and a plurality of latch devices. The buoyancy restraint device is adapted to evenly submerge and hold dried legumes in a vat of rehydration liquid at a level below the level of the liquid in the rehydration vat and to allow the liquid to rise past the restraint device and above the level of the legumes through a sufficient distance to provide an ample supply of liquid to accommodate the rehydration of the dried legumes. The buoyancy detection device is connected to the buoyancy restraint device and adapted to detect the change in buoyancy of the legumes by monitoring the upward and downward movement of the restraint device relative to the rehydration vat and thereby the change in the buoyancy of the legumes which underlie the restraint device. The latch devices are connected and adapted to secure the buoyancy detection device to the rehydration vat by manually actuating the latch devices between latched and unlatched positions relative to an upper edge portion of the rehydration vat.

20 Claims, 3 Drawing Sheets

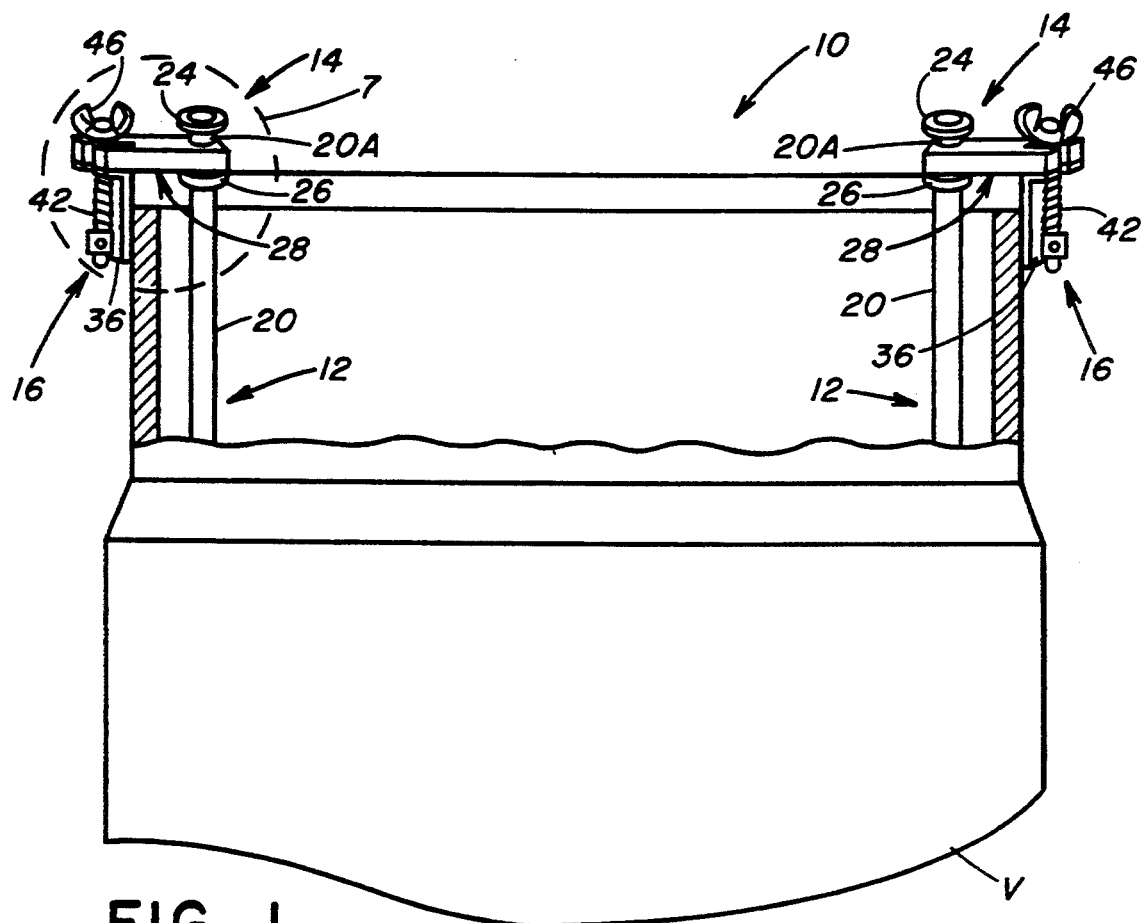
FIG. 1
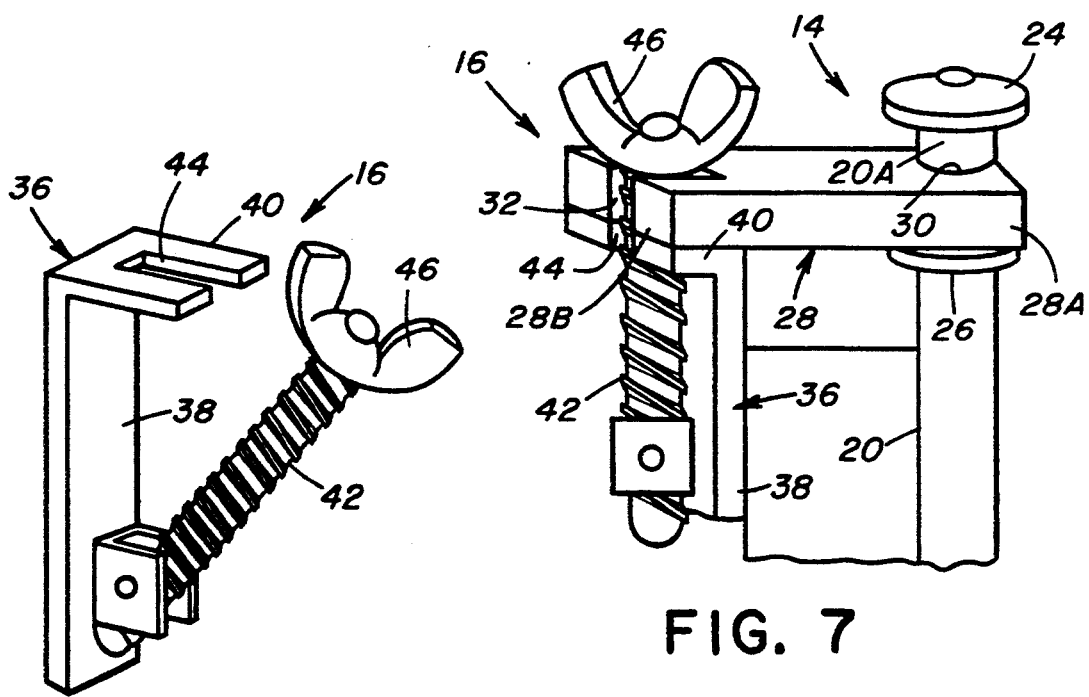
FIG. 8
FIG. 7

LEGUME REHYDRATION CONTROL APPARATUS AND METHOD USING BUOYANCY RESTRAINT AND DETECTION

CROSS-REFERENCE TO RELATED APPLICATION

This application is a continuation-in-part of U.S. patent application Ser. No. 07/982,503, filed Nov. 27, 1992, now abandoned.

BACKGROUND OF THE INVENTION

1. Field of the Invention

The present invention generally relates to techniques for rapid rehydration of legumes and the like and, more particularly, is concerned with a legume rehydration control apparatus and method using buoyancy restraint and detection for achieving accelerated legume rehydration without loss of quality.

2. Description of the Prior Art

It is well-known that the seeds of legumes, for the sake of brevity hereinafter referred to as legumes, are valuable foods and are widely used for such purpose. The legumes are especially valuable for their high content of protein. However, to increase their digestibility and to improved their taste, the legumes are subjected to a process in which they are first dried and then rehydrated to restore moisture to make them soft and tender, as well as to cook them to remove unpleasant raw tastes.

Many different processes of drying and rehydrating legumes have been used over the years. With respect to the drying part of processing legumes, for many years a common practice has been to dry legumes naturally in the field. Other drying techniques utilized have involved using forced air to dry legumes in order to preserve the product from rot, molds, aflatoxins and the like.

However, the main problem has arisen with respect to the rehydrating part of processing legumes. The objective has been to find a technique of rehydrating the dried legumes in a fast, effective way while preserving product quality. Representative examples of approaches to rehydration found in the prior patent art are the ones disclosed in U.S. Pat. Nos. to Morris (2,584,150), Keely (3,719,502), Hitze et al (3,867,553), Wagner et al (3,876,807), Bevan et al (4,088,790), Baxley (4,113,889), Fritze (4,233,322), Sakakibara et al (4,348,421), Luchetti (4,543,878), Turner (4,816,270), Bakker et al (4,900,578) and Zanichelli (4,940,590).

Some techniques used heretofore are able to preserve product quality, but do not achieve rapid rehydration. Still other techniques rely on preset time limits with mechanical movement (that may affect product quality) between hot and cool liquids to achieve rapid rehydration of the product.

Consequently, a need still exists for an effective technique to rehydrate dried legumes rapidly and still preserve quality.

SUMMARY OF THE INVENTION

The present invention satisfies the aforementioned needs by providing a legume rehydration control apparatus and method which restrains and detects the buoyancy of the legumes so as to achieve accelerated legume rehydration without reduction in quality. The legume rehydration control apparatus and method of the present invention handles the dried legumes during the rehydration process in a manner more gentle and less damaging than that of most prior art techniques and also controls the rehydration process in a manner more sensitive and responsive than that of many prior art techniques. As a result, the rehydration of legumes of high quality is achieved over a period of time which is substantially shorter in duration than found in many prior art techniques.

Accordingly, the present invention is directed to a legume rehydration control apparatus and method which employ a buoyancy restraint device adapted to overlie and evenly submerge and hold dried legumes in a vat of rehydration liquid. The buoyancy restraint device is adapted to hold the dried legumes at a level below the level of the liquid in the rehydration vat and to allow the liquid to rise past the buoyancy restraint device and above the level of the legumes through a sufficient distance to provide an ample supply of liquid to accommodate the rehydration of the dried legumes.

The legume rehydration control apparatus and method also employ a buoyancy detection device coupled to the buoyancy restraint device to permit the latter to undergo vertical movement relative to the vat. The buoyancy detection device is adapted to monitor the upward and downward movement of the buoyancy restraint device and to detect the change in the vertical position of the buoyancy restraint device relative to the rehydration vat and thereby the change in the buoyancy of the rehydrating legume which correlates in a known predetermined relationship to the change in the vertical position of the buoyancy restraint device.

The legume rehydration control apparatus and method further employ means in the form of a plurality of latch devices for releasably securing the buoyancy detection device to the rehydration vat. The latch devices are adapted to be manually actuated between latched and unlatched positions relative to an upper edge portion of the rehydration vat.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of an apparatus for controlling rehydration of legumes in accordance with the present invention, being shown in conjunction with a rehydration vat.

FIG. 7 is an enlarged detailed perspective view of the portion of the legume rehydration control apparatus enclosed by circle 7 of FIG. 1, showing one of a plurality of latch devices of the apparatus in a latched position thereby releasably securing the buoyancy restraint and detection devices to the rehydration vat.

FIG. 8 is a perspective view of the latch device in an unlatched position.

DESCRIPTION OF THE PREFERRED EMBODIMENTS

Figure 2:
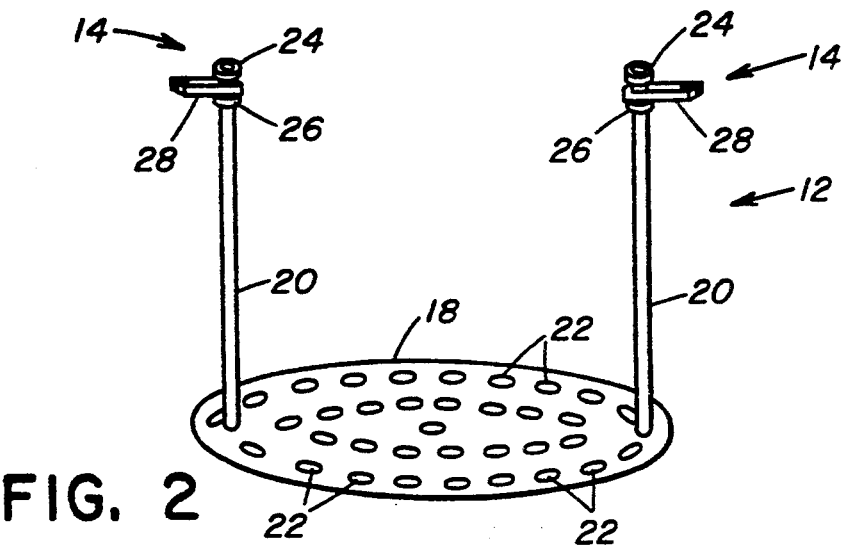
FIG. 2 is a perspective view, on a smaller scale, of a first embodiment of a buoyancy restraint device of the legume rehydration control apparatus of FIG. 1.

Referring to the drawings and particularly to FIG. 1, there is illustrated a legume rehydration control apparatus of the present invention, generally designated 10. Basically, the legume rehydration control apparatus 10 includes a buoyancy restraint device 12, a buoyancy detection device 14 and a plurality of latch devices 16.

Figure 3:
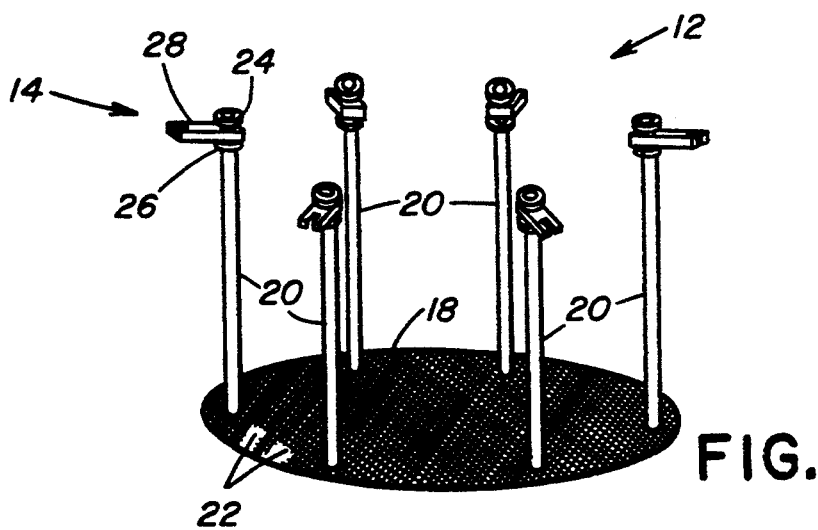
FIG. 3 is a perspective view of a second embodiment of the buoyancy restraint device of the apparatus.
Figure 4:
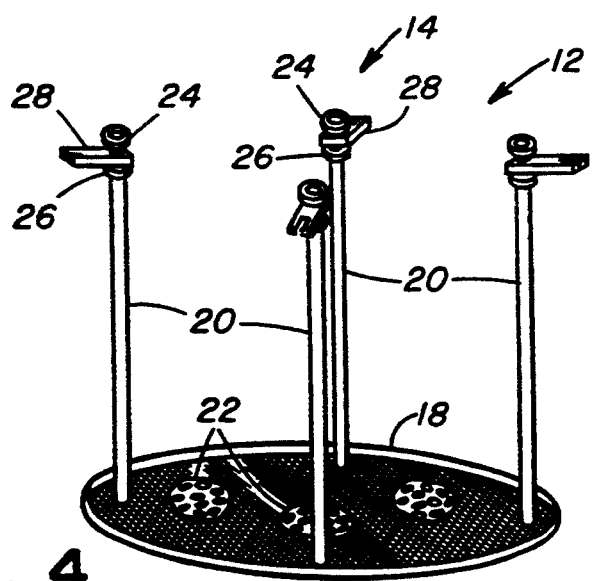
FIG. 4 is a perspective view of a third embodiment of the buoyancy restraint device of the apparatus.

Referring to FIGS. 2–4, the buoyancy restraint device 12 of the apparatus 10 includes a restraint plate 18 and a plurality of elongated suspension rods 20. The restraint plate 18 has a generally flat configuration and a plurality of openings 22 defined therein being sufficiently large in size to permit the flow of rehydration fluid therethrough while being sufficiently small in size to prevent the movement of legumes therethrough. The suspension rods 20 are attached at their lower ends to the restraint plate 16 at locations adjacent to the periphery thereof and circumferentially spaced from one another. Also, the suspension rods 20 may either be removably or permanently attached to the plate 18. Any of the different embodiments of the restraint device 12 shown in FIGS. 2 to 4 can be used. In a first embodiment of the restraint device 12 shown in FIG. 2, the plate 18 is made of a perforated stainless steel material and there are two suspension rods 20. In a second embodiment of the restraint device 12 shown in FIG. 3, the plate 18 is made of a stainless steel mesh material and there are six suspension rods 20. In a third embodiment of the restraint device 12 shown in FIG. 4, the plate 18 is made of a combination stainless steel mesh and perforated material and there are four suspension rods 20.

Figure 5:
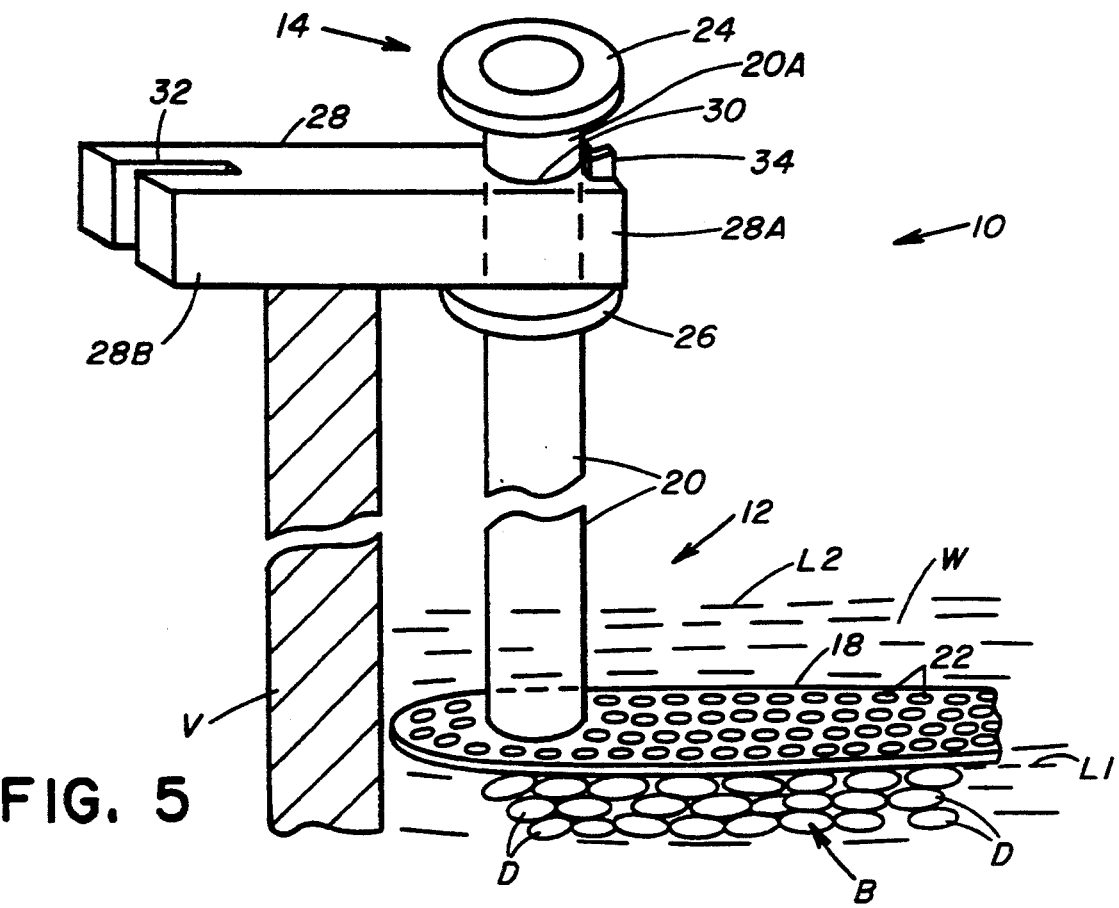
FIG. 5 is an enlarged fragmentary perspective view of a buoyancy detection device of the legume rehydration control apparatus of FIG. 1, showing the buoyancy detection device in an initial condition at the start of rehydration of legumes.
Figure 6:
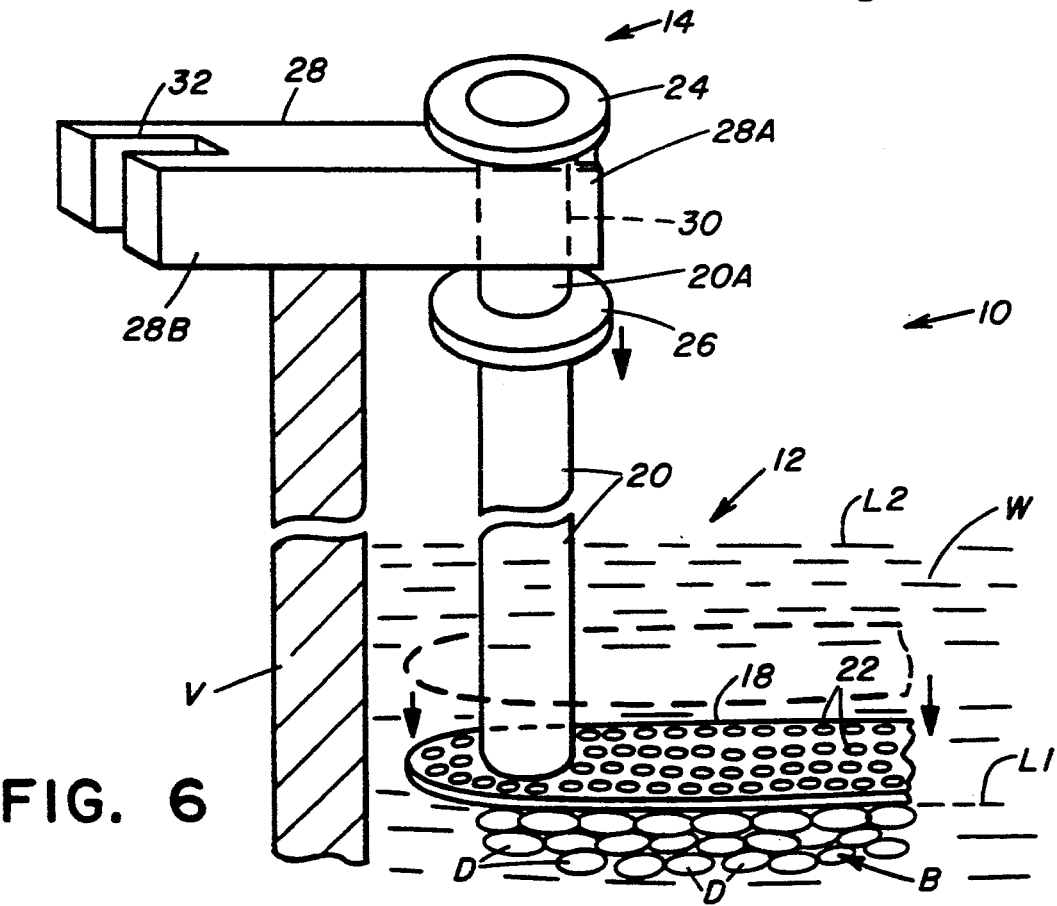
FIG. 6 is a view similar to that of FIG. 5 but showing the buoyancy detection device in a final condition at the completion of rehydration of legumes.

With the above-described construction, the buoyancy restraint device 12 is adapted to overlie and evenly submerge and hold a batch B of dried legumes in a vat V of rehydration liquid, such as ordinary water W, as seen in FIGS. 5 and 6. Furthermore, the buoyancy restraint device 12 is adapted to hold the batch B of dried legumes with its upper level L1 located below the upper level L2 of the liquid in the rehydration vat V and to allow the liquid W when being added to the vat V to rise in the vat V past the buoyancy restraint device 12 and above the upper level L2 of the legumes D through a sufficient distance to provide an ample supply of liquid to accommodate the rehydration of the dried legumes D. The buoyancy detection device 14 and latch devices 16, which are described in detail below, suspend the buoyancy restraint device 12 in the vat V of rehydration liquid W at a vertical position therein in which its restraint plate 18 overlies the batch B of dried legumes and submerges and holds the batch B of dried legumes in the rehydration liquid below an upper level L2 thereof.

Referring to FIGS. 1 and 5 to 8, the buoyancy detection device 14 of the apparatus 10 includes a plurality of pairs of upper and lower stop elements 24, 26 and a plurality of guide members 28 corresponding in number to the number of pairs of upper and lower stop elements 24, 26 or to the number of suspension rods 20. Each pair of upper and lower stop elements 24, 26 of the buoyancy detection device 14 takes the form of a pair of annular collars attached on an upper end portion 20A of a respective one of the suspension rods 20. The upper and lower stop elements 24, 26 are spaced apart from one another by a predetermined amount which is equal to a maximum amount of change permissible in the vertical position of the buoyancy restraint device 12 in the vat V that correlates with the change in buoyancy of the batch B of legumes necessary to complete the rehydration of the batch B of legumes.

Each guide member 28 of the buoyancy detection device 14 has a pair of opposite ends 28A, 28B with a passage 30 defined through one opposite end 28A and a slot 32 defined through the other opposite end 28B. The one opposite end 28A of the guide member 28 is disposed between the pair of spaced upper and lower stop elements 24, 26 on a respective one of the suspension rods 20. The passage 30 through the one opposite end 28A of the guide member 28 receives the upper end portion 20A of the respective one suspension rod 20 for free upward and downward movement therethrough as the buoyancy restraint device 12 changes its vertical position in the vat V in response to change in the buoyancy of the batch B of legumes in the vat V. More particularly, the one end 28A of the guide member 28 will be engaged with the lower stop element 26 at the initiation of rehydration of the batch B of legumes and will become engaged with the upper stop element 24 at completion of rehydration of the batch B of legumes.

Also, preferably although not necessarily, the buoyancy detection device 14 includes means 34 for sensing when contact is made between the upper stop element 24 of the one end 28A of the respective guide member 28 associated with at least one of the suspension rods 20 and for providing an indication, such as a sound or light, when the contact is sensed. The contact sensing means 34 is disposed adjacent to the upper end portion 20A of the one suspension rod 20 and adjacent to the guide member 28 corresponding to the one suspension rod 20. The contact sensing means 34 can take any suitable form, using either mechanical, electrical or pneumatic energy. One suitable form is an electromechanical microswitch which activates an alarm of light.

As a result of its above-described construction, the buoyancy detection device 14 is adapted to detect the change in buoyancy of the batch B of legumes by monitoring the upward and downward movement of the buoyancy restraint device 12 relative to the rehydration vat V and thereby the change in the buoyancy of the batch B of legumes which underlie and thus cause the change in position of the buoyancy restraint device 12. The buoyancy detection device 14 is thus coupled to the buoyancy restraint device 12 and stationarily secured to the vat V so as to permit the buoyancy restraint device 12 to freely undergo vertical movement relative thereto during rehydration of the batch B of legumes in the vat V. The buoyancy detection device 14 being adapted to sense a change in the vertical position of the buoyancy restraint device 12 in the vat V in response to rehydration of the batch B of legumes therein, thereby detects when the change in the vertical position of the buoyancy restraint device 12 correlates with completion of the rehydration of the batch B of legumes.

Referring to FIGS. 7 and 8, each of the latch devices 16 of the apparatus 10 includes an elongated bracket 36 having a main leg 38 and an upper bent bifurcated end portion 40, and an adjustable swivelable fastener 42 pivotally mounted at one end to the lower end of the main leg 38 of the bracket 36 and insertable through a slot 44 defined in the bifurcated end portion 40 of the bracket 36 and through the slot 32 defined in the opposite one end 28B of a respective one of the guide members 28. When the bracket 36 of each latch device 16 is placed below the lower surface of the opposite slotted end 28B of a respective one of the guide members 28 and a wing nut 46 on the fastener 42 of each latch device 16 is tightened down against the upper surface of the opposite end 28B of the respective one guide member 28, the bracket 36 is then firmly secured in a downwardly extending position from the guide member 28 such that the latch devices 16 are disposed about and engaged with the outside of the upper end portion of the vat V so as to retain the guide members 28 of the buoyancy detection device 14 in the stationary position relative to the vat V, permitting the free vertical movement of the buoyancy restrain device 12 within the vat V.

With the above-described construction, the latch devices 16 thereby stationarily secure the buoyancy detection device 14 to the vat V which, in turn, freely movably suspends the buoyancy restraint device 12 in the vat V. By adjustment of the fasteners 42, the latch devices 16 can be manually actuated from latched to unlatched positions relative to the upper edge portion of the rehydration vat V to thereby release the buoyancy detection device 14, and the buoyancy restraint device 12 therewith, for removal from the rehydration vat V. All of the above-described components of the buoyancy restraint device 12, buoyancy detection device 14 (except for the contact sensing means 34) and the latch devices 16 are fabricated from a suitable material, such as non-ferrous stainless steel, which is compatible with processing of food products.

The aforedescribed control apparatus 10 is employed in rehydrating the legumes as follows.

First, the batch B of dried legume and then the buoyancy restraint device 12 are placed in the vat V. The buoyancy detection device 14 and latch devices 16 are applied to the upper end portion of the vat V such that the suspension rods 20 of the buoyancy restraint device 12 are plumb and free to move up and down easily. The restraint device 12 should be centered in the vat and leave no more than a small clearance, for instance three-eighths of an inch clearance, from the side wall of the vat to prevent legumes from rising above the restraint plate 18.

Second, the rehydration liquid, such as ordinary water W, is added to the vat V. The liquid is added until the buoyancy restraint device 12 holds the dried legumes with its upper level L1 below the upper level L2 of the liquid in the rehydration vat V, the openings 22 in the restraint plate 18 allowing the liquid to rise above the restraint plate 18 of the buoyancy restraint device 12 and above the upper level L1 of the batch B of legumes through a sufficient distance to provide an ample supply of liquid to accommodate the rehydration of the dried legumes. Thus, just before the initiation of the rehydration of the legumes, the buoyancy restraint device 12 is now provided in the vat of rehydration liquid at a vertical position therein at which the buoyancy restraint device plate 18 overlies the batch of dried legumes and submerges and holds them in the rehydration liquid spaced below the upper level L1 thereof. The guide members 28 of the buoyancy detection device 14 are now engaged with the lower stop elements 26 on the suspension rods 20 of the buoyancy restraint device 12, as shown in FIG. 5.

Third, the vat V of rehydration liquid is heated to bring the liquid to a boil for a preselected period of time and under an open atmospheric environment.

Fourth, the heating the vat of rehydration liquid is terminated creating a pressure differential between the liquid and submerged dried legumes that causes expansion of the legumes and passages of liquid therein until completion of rehydration has occurred. As rehydration of the legumes occurs, their buoyancy decreases and they sink toward the bottom of the vat. As the rehydrated legumes sink in the rehydration liquid, the buoyancy restraint device descends also.

Fifth, the completion of rehydration of the legumes is detected when the buoyancy detection device 14 senses the desired amount change in the vertical position of the buoyancy restraint device 12 in the vat. Such change is sensed when the guide members 28 become engaged with the upper stop elements 24 as shown in FIG. 6. The desired amount of change in the vertical position of the buoyancy restraint device 12 as identified by the spacing between the upper and lower stop elements 24, 26 is correlated with the desired change in the buoyancy of the rehydrating legumes which will determined when the desired amount of rehydration has been completed.

Sixth and finally, the buoyancy restraint and detection devices 12, 14 are released and removed from the vat and the rehydrated legumes are strained from the liquid.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A legume rehydration control apparatus, comprising:
   (a) a buoyancy restraint device insertable into a vat of rehydration liquid to a vertical position therein at which said buoyancy restraint device overlies a batch of dried legumes and submerges and holds the batch of dried legumes in the rehydration liquid below an upper level thereof; and
   (b) a stationary buoyancy detection device coupled to said buoyancy restraint device and securable to the vat so as to permit said buoyancy restraint device to undergo vertical movement relative thereto during rehydration of the legumes in the vat, said buoyancy detection device being adapted to sense a change in the vertical position of said buoyancy restraint device in the vat in response to rehydration of the legumes therein and thereby detect a change in the buoyancy of the rehydrating legumes which correlates in a predetermined relationship to the change in the vertical position of said buoyancy restraint device.

2. The apparatus of claim 1 further comprising:
   means for releasably and stationarily securing said buoyancy detection device to the vat.

3. The apparatus of claim 2 wherein said securing means is a plurality of latch devices actuatable between latched and unlatched positions relative to vat.

4. The apparatus of claim 1 wherein said buoyancy restraint device includes a restraint plate having a plurality of openings defined therein being sufficiently large in size to permit the flow of rehydration liquid therethrough while being sufficiently small in size to prevent the movement of legumes therethrough.

5. The apparatus of claim 4 wherein said restraint plate is substantially flat in configuration and made of a rigid perforated material.

6. The apparatus of claim 4 wherein said restraint plate is substantially flat in configuration and made of a rigid mesh material.

7. The apparatus of claim 4 wherein said buoyancy restraint device includes a plurality of suspension rods attached at lower ends to said restraint plate and extending upwardly therefrom.

8. The apparatus of claim 7 wherein said buoyancy detection device includes a plurality of pairs of upper and lower stop elements, each of said pairs of upper and lower stop elements being attached on an upper end portion of one of said suspension rods and spaced apart from one another by an amount equal to a maximum amount of change permissible in the vertical position of said buoyancy restraint device in the vat which has a predetermined correlation with the buoyancy of the legumes when the legumes have completed rehydration.

9. The apparatus of claim 8 wherein said buoyancy detection device also includes a plurality of guide members corresponding in number to said plurality of rods, each of said guide members having a pair of opposite ends and a passage defined through one of said opposite ends, said one of said opposite ends of said guide member being disposed between said pair of upper and lower spaced stop elements on one of said suspension rods and said passage through said one end of said guide member receiving said upper end portion of said one suspension rod therethrough such that said guide member engages said lower stop element at the initiation of rehydration of the legumes and engages said upper stop element at the completion of rehydration of the legumes.

10. The apparatus of claim 9 further comprising:
a plurality of latch devices each being adapted to stationarily secure one of said guide members to the vat.

11. The apparatus of claim 10 wherein each of said latch devices includes an elongated bracket and an adjustable fastener pivotally mounted to said bracket and insertable through a slot defined in an opposite one of said ends of said one guide members to secure said bracket in a downwardly extending position from said one guide member such that each of said brackets is disposed and engaged with the outside of the vat so as to retain said guide members in the stationary position relative thereto and to permit vertical movement of the buoyancy restrain device within the vat.

12. The apparatus of claim 9 wherein said buoyancy detection device also includes means for sensing contact between said upper and lower stop elements of one of said rods and said guide member corresponding to said one rod.

13. The apparatus of claim 12 wherein said contact sensing means is disposed adjacent to said upper end portion of said one rod and adjacent to said guide member corresponding to said one rod.

14. A legume rehydration control apparatus, comprising:
(a) a buoyancy restraint device insertable into a vat of rehydration liquid to a vertical position therein at which said buoyancy restraint device overlies a batch of dried legumes and submerges and holds the batch of dried legumes in the rehydration liquid below an upper level thereof, said buoyancy restraint device including
(i) a restraint plate having a substantially flat configuration and a plurality of openings defined therein being sufficiently large in size to permit the flow of rehydration liquid therethrough while being sufficiently small in size to prevent the movement of legumes therethrough, and
(ii) a plurality of suspension rods attached at lower ends to said restraint plate and extending upwardly therefrom;
(b) a stationary buoyancy detection device coupled to said buoyancy restraint device and securable to the vat so as to permit said buoyancy restraint device to undergo vertical movement relative thereto during rehydration of the legumes in the vat, said buoyancy detection device being adapted to sense a change in the vertical position of said buoyancy restraint device in the vat in response to rehydration of the legumes therein and thereby detect a change in the buoyancy of the rehydrating legumes which correlates in a predetermined relationship to the change in the vertical position of said buoyancy restraint device, said buoyance detection device including
(i) a plurality of pairs of upper and lower stop elements, each of said pairs of upper and lower stop elements being attached on an upper end portion of one of said suspension rods and spaced apart from one another by an amount equal to a maximum amount of change permissible in the vertical position of said buoyancy restraint device in the vat which has a predetermined correlation with the buoyancy of the legumes when the legumes have completed rehydration, and
(ii) a plurality of guide members corresponding in number to said plurality of rods, each of said guide members having a pair of opposite ends and a passage defined through one of said opposite ends, said one of said opposite ends of said guide member being disposed between said pair of upper and lower spaced stop elements on one of said suspension rods and said passage through said one end of said guide member receiving said upper end portion of said one suspension rod therethrough such that said guide member engages said lower stop element at initiation of rehydration of the legumes and engages said upper stop element at completion of rehydration of the legumes; and
(c) a plurality of latch devices each coupled to one of said guide members of said buoyancy detection device and to the vat and actuatable to stationarily secure said one guide member to the vat.

15. The apparatus of claim 14 wherein said buoyancy detection device also includes means for sensing contact between said upper and lower stop elements of one of said rods and said guide member corresponding to said one rod.

16. The apparatus of claim 15 wherein said contact sensing means is disposed adjacent to said upper end portion of said one rod and adjacent to said guide member corresponding to said one rod.

17. A legume rehydration control method, comprising the steps of:

(a) providing a buoyancy restraint device in a vat of rehydration liquid to a vertical position therein at which the buoyancy restraint device overlies a batch of dried legumes and submerges and holds the batch of dried legumes in the rehydration liquid below an upper level thereof; and (b) sensing a change in the vertical position of the buoyancy restraint device in the vat in response to rehydration of the legumes therein and thereby detecting a change in the buoyancy of the rehydrating legumes which correlates in a predetermined relationship to the change in the vertical position of the buoyancy restraint device in the vat.

18. The method of claim 17 further comprising:

heating the vat of rehydration liquid to bring the liquid to a boil; and after heating the vat of rehydration liquid for a preselected period of time, terminating the heating of the vat of rehydration liquid in order to create a pressure differential between the liquid and submerged dried legumes that causes expansion of the legumes and passages of liquid therein until completion of rehydration has occurred.

19. The method of claim 17 wherein the dried legumes and buoyancy restraint device are first placed in the vat and then the rehydration liquid is added to the vat.

20. The method of claim 17 wherein such that a buoyancy detection device engages a lower stop element of the buoyancy restraint device at the initiation of rehydration of the legumes and engages an upper stop element of the buoyancy restraint device at the completion of rehydration of the legumes.

* * * * *